United States Patent
Jun et al.

(10) Patent No.: US 11,450,347 B2
(45) Date of Patent: Sep. 20, 2022

(54) DATA GROUP PLAYBACK DEVICE AND SYSTEM AND METHOD FOR SAME

(71) Applicant: MUSICMOB CO., LTD., Seoul (KR)

(72) Inventors: Heon-Joo Jun, Yongin-si (KR); Mi-Soon Kim, Yongin-si (KR)

(73) Assignee: MUSICMOB CO., LTD., Seoul (KR)

( * ) Notice: Subject to any disclaimer, the term of this patent is extended or adjusted under 35 U.S.C. 154(b) by 0 days.

(21) Appl. No.: 17/602,691

(22) PCT Filed: Apr. 9, 2020

(86) PCT No.: PCT/KR2020/004828
§ 371 (c)(1),
(2) Date: Oct. 8, 2021

(87) PCT Pub. No.: WO2020/209632
PCT Pub. Date: Oct. 15, 2020

(65) Prior Publication Data
US 2022/0165305 A1    May 26, 2022

(30) Foreign Application Priority Data
Apr. 10, 2019   (KR) .................. 10-2019-0042042

(51) Int. Cl.
*G11B 27/10*     (2006.01)
*G11B 20/10*     (2006.01)

(52) U.S. Cl.
CPC .. *G11B 20/10527* (2013.01); *G11B 20/10037* (2013.01); *G11B 20/10222* (2013.01); *G11B 2020/10574* (2013.01)

(58) Field of Classification Search
None
See application file for complete search history.

(56) References Cited

U.S. PATENT DOCUMENTS

2002/0031065 A1* 3/2002 Kajiyama ............. G11B 27/34
2003/0231871 A1* 12/2003 Ushimaru .......... H04N 21/4394
                                                                   375/E7.278
(Continued)

FOREIGN PATENT DOCUMENTS

JP     2001-075985    3/2001
KR     10-0683337     2/2007
(Continued)

OTHER PUBLICATIONS

KR Notification of Reason for Refusal in Korean Application No. 10-2019-0042042, dated Aug. 23, 2020, 19 pages (with English translation).
(Continued)

*Primary Examiner* — Peter Vincent Agustin
(74) *Attorney, Agent, or Firm* — Fish & Richardson P.C.

(57) ABSTRACT

The present invention provides an apparatus, system and method for reproducing data in groups. According to the apparatus, system and method for reproducing data in groups, some piece of data of sound source data that is already being reproduced through a specific terminal or external speaker is input through a microphone and compared with the entire data of the sound source data, thus to identify a current reproduction point, and synchronize the reproduction point with sound source data being played externally, thereby reproducing the sound source data at the same time.

13 Claims, 8 Drawing Sheets

(56) References Cited

U.S. PATENT DOCUMENTS

| | | | | |
|---|---|---|---|---|
| 2012/0222540 A1* | 9/2012 | Usui | ............... | G10H 1/0025 |
| | | | | 84/622 |
| 2016/0291925 A1* | 10/2016 | Kohara | ............... | G06F 3/165 |
| 2019/0179509 A1* | 6/2019 | Daie | ............... | G06F 3/0485 |
| 2020/0059561 A1* | 2/2020 | Murali | ............... | H04N 7/152 |

FOREIGN PATENT DOCUMENTS

| | | |
|---|---|---|
| KR | 10-2014-0022537 | 2/2014 |
| KR | 10-2017-0009650 | 1/2017 |
| KR | 10-2020-0072239 | 6/2020 |

OTHER PUBLICATIONS

KR Grant of Patent in Korean Application No. 10-2019-0042042, dated Dec. 8, 2020, 4 pages (with English Translation).

\* cited by examiner

DATA GROUP PLAYBACK DEVICE AND SYSTEM AND METHOD FOR SAME

CROSS-REFERENCE TO RELATED APPLICATIONS

This application is a National Stage application under 35 U.S.C. § 371 of International Application No. PCT/KR2020/004828, having an International Filing Date of Apr. 9, 2020, which claims priority to Korean Application Serial No. 10-2019-0042042, filed on Apr. 10, 2019. The disclosures of the prior applications are considered part of the disclosure of this application, and are incorporated in their entirety into this application.

BACKGROUND OF THE INVENTION

1. Field of the Invention

The present invention relates to an apparatus, system and method for reproducing data in groups, and more specifically, to an apparatus, system and method for reproducing data in groups, in which some piece of data of sound source data that is already being reproduced through a specific terminal or external speaker is input through a microphone and compared with the entire data of the sound source data, thus to identify a current reproduction point, and synchronize the reproduction point with sound source data being played externally, thereby reproducing the sound source data at the same time.

2. Description of the Related Art

As well known in the art, in order to output data at a volume level loud enough to listen to music in many places where data reproduction such as a music is required, it is necessary to provide a speaker having a fairly large output.

However, speakers with that level of output are bulky and heavy, such that it is inconvenient to carry them. In addition, since it cannot determine when users need to play music, it is not possible to always carry the speaker.

Recently, Bluetooth speakers of various sizes and shapes have been released to help to reproduce a music. However, since such a Bluetooth speaker also does not have a large output capacity, it is difficult to expect an output of satisfactory performance unless it is reproduced in a closed and narrow space.

In this regard, since all individuals carry smart phones, if specific data is reproduced at the same time using such personal smart phones, a reproduction performance of a fairly large output may be expected.

However, implementing these functions is not practical due to several problems as follows.

First, when users make a promise to each other and several smart phones thereof start reproducing specific data at the same time, it is possible to simultaneously output sound sources or movies. However, since it is almost impossible to match the reproducing start timings of quite a number of smart phones at the same time, there is a problem that it is very difficult to simultaneously reproduce the sound sources or movies in groups.

Second, in a situation where several smart phones are already reproducing specific data, it is difficult to know the current reproduction point of the data, even if a user who wants to play data together wants to participate in a reproduction group. In addition, even if a user of the reproducing smart phone knows the current reproduction point, the reproduction point is already changed in real time while the reproduction point is notified to the user who wants to reproduce. Therefore, it is impossible to match the reproduction points.

As a result, it is impossible to synchronize the reproduction points because the device performance of each smart phone receiving reproduction point information, in particular, the time it takes to reproduce the data is different for each device.

In addition, since a time difference occurs depending on a network speed, it is more difficult to synchronize the reproduction points. Another problem is that a difference in the network speed occurs according to each location.

Therefore, even if the smart phone reproducing the data transmits the current reproduction location information to a smart phone of another user who wants to participate in the reproducing, due to the network speed or the reproducing delay time delayed in the device until reproducing, there is a problem that the data is reproduced after a delay of 1 second or 2 seconds.

SUMMARY OF THE INVENTION

In consideration of the above-mentioned circumstances, it is an object of the present invention to provide an apparatus, system and method for reproducing data in groups, in which some piece of data of sound source data that is already being reproduced through a specific terminal or external speaker is input through a microphone and compared with the entire data of the sound source data, thus to identify a current reproduction point, and synchronize the reproduction point with sound source data being played externally, thereby reproducing the sound source data at the same time.

To achieve the above object, according to one aspect of the present invention, there is provided an apparatus for reproducing data in groups including: a synchronization controller 14 configured to compare some piece of data 100 of sound source data input through a microphone 4 with sound source data 200 pre-stored therein, search for reproduction points of the piece of data 100 in the sound source data 200, and synchronize reproduction points with each other, so that specific sound source data are synchronized with each other and reproduced simultaneously in a plurality of user terminals.

Preferably, the synchronization controller 14 includes: a comparison unit 16 configured to compare the some piece of data 100 of the sound source data input through the microphone with sound source data 200 pre-stored therein; a reproduction point determination unit 18 configured to search for a reproduction point of the piece of data 100 in the sound source data 200 pre-stored therein; and a reproduction point synchronization processer 20 configured to control synchronization so as to reproduce the sound source data 200 at the reproduction point determined by the reproduction point determination unit 18.

Preferably, the apparatus further includes an analog-to-digital converter (ADC) provided at a rear end of the microphone 4 to convert an analog sound source into digital data.

Preferably, the apparatus further includes a sound source data storage 6 configured to store the sound source data 200.

Preferably, the apparatus further includes: a decoding unit 22 configured to, when the sound source data 200 is MP3 data, convert the MP3 data into PCM data; and a PCM data storage unit 24 configured to store the decoded PCM data.

Preferably, the comparison unit 16 numerically compares the piece of data 100 with the sound source data 200.

Preferably, the reproduction point determination unit 18 drives a comparison cycle between an output point of the sound source data synchronized through the reproduction point synchronization processer 20 and the reproduction point of the piece of data 100 received through the microphone 4 a number of times, and when the reproduction point is within a preset error range, the comparison cycle ends.

Preferably, the sound source data 200 includes composite data 60 matched with lighting blinking data 62 including lighting colors and lighting patterns, and controls so that the lighting to blink or turn on at a predetermined reproduction point of the sound source data 200.

Meanwhile, according to another aspect of the present invention, there is provided a system for reproducing data in groups including: a data group reproducing apparatus 2 configured to provide some piece of data 100 of sound source data input through a microphone 4 to a sound source providing server 30 to receive sound source data 200, compare the piece of data 100 with the sound source data 200, search for reproduction points of the piece of data 100 in the sound source data 200, and synchronize the reproduction points, so that specific sound source data are synchronized with each other and reproduced simultaneously in a plurality of user terminals; and a sound source providing server 30 configured to receive the piece of data 100 from the data group reproducing apparatus 2, extract the sound source data 200 matched with the piece of data 100, and provide it to the data group reproducing apparatus 2.

Preferably, the sound source providing server 30 includes: a PCM data storage unit 42 configured to convert the sound source data 200 into PCM data to be comparable and store the same therein; and a comparison unit 40 configured to numerically compare the piece of data 100 with a plurality of sound source data included in the PCM data storage unit 42 to specify any one sound source data 200 matched with the piece of data 100.

Further, according to another aspect of the present invention, there is provided a method for reproducing data in groups including: a) comparing piece of data 100, which is a portion of sound source data input through a microphone, with sound source data 200 pre-stored therein by a comparison unit 16; b) searching for reproduction points of the piece of data 100 in the pre-stored sound source data 200 by a reproduction point determination unit 18; and c) reproducing specific sound source data 200 at a specific reproduction point searched for by the reproduction point determination unit 18 by the reproduction point synchronization processer 20.

Preferably, the step a) includes: comparing the piece of data 100 with a plurality of sound source data stored in the sound source data storage unit 6 and extract any one sound source data matched with the piece of data 100 by the comparison unit 16; or extracting the sound source data by a signal of a user who designates the specific sound source data.

Preferably, the step a) includes: if the sound source data 200 matched with the piece of data 100 is not present in a sound source data storage unit 6, automatically and remotely transmitting the piece of data 100 to a sound source providing server 30 by a data group reproducing apparatus 2 to request a provision of the sound source data 200.

Preferably, after the step c), the method further includes: reproducing the sound source data at a specific point through the reproduction driving unit 8 by the reproduction point synchronization processer 20; comparing an output point of the synchronized sound source data with the reproduction point re-searched through the steps a) and b) by the reproduction point determination unit 18; determining whether the reproduction point is within a preset error range; and if the reproduction point is within the preset error range, ending a comparison cycle.

Preferably, the step c) includes: when lighting blinking data 62 matched with the sound source data 200 is present, determining whether an output point of the preset lighting blinking data 62 elapses by the reproduction point synchronization processer 20; and when the output point elapses, controlling the lighting reproduction driving unit 50 to turn on or blink the lighting by the reproduction point synchronization processer 20.

According to the apparatus, system, and method for reproducing data in groups of the present invention, it is possible to reproduce the sound source data with synchronized reproduction points through user terminals in a state in which specific sound source data is already being reproduced through the smart phones or an external speaker provided in a plaza or concert hall. Therefore, a plurality of users can reproduce the same sound source data together in groups without carrying an additional apparatus or device, such that the volume may be amplified. In addition, by blinking the lighting every period of a certain bit of a signal, etc. based on the lighting data matched in advance with the sound source data, it is possible to give greater pleasure and obtain a synergistic effect.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described in detail with reference to the drawings.

Figure 1:
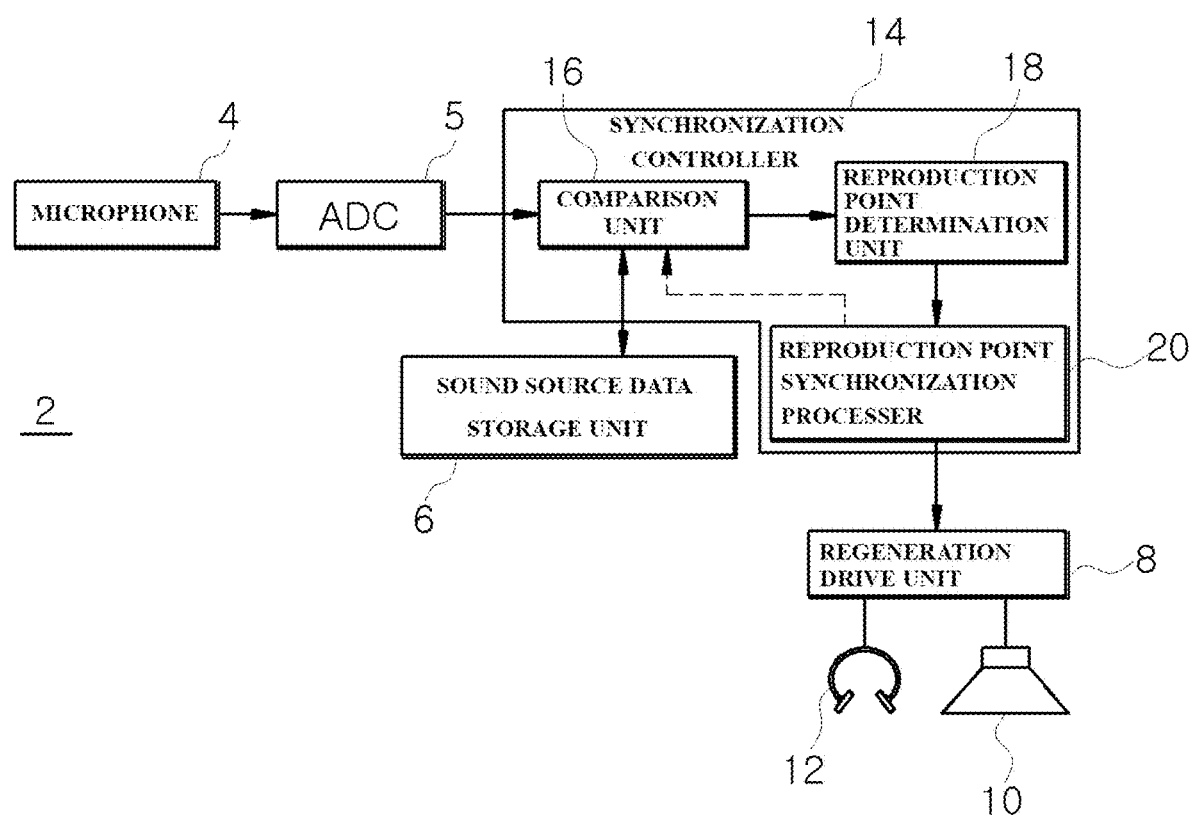
FIG. 1 is a block diagram illustrating a configuration of an apparatus for reproducing data in groups ('data group reproducing apparatus') according to an embodiment of the present invention.
Figure 2:
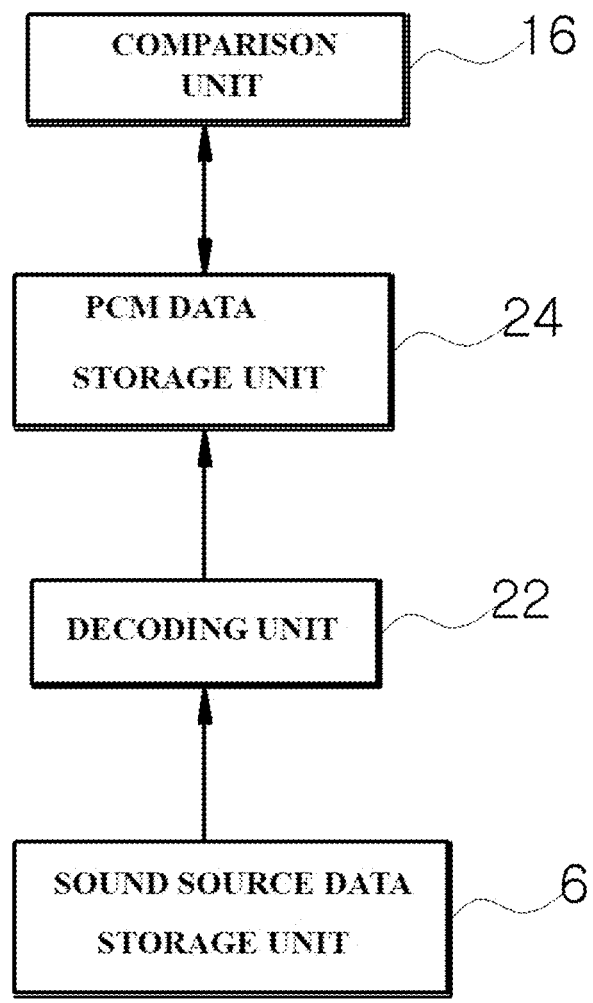
FIG. 2 is a block diagram illustrating an expanded configuration of a data storage unit included in the data group reproducing apparatus according to an embodiment of the present invention.
Figure 3:
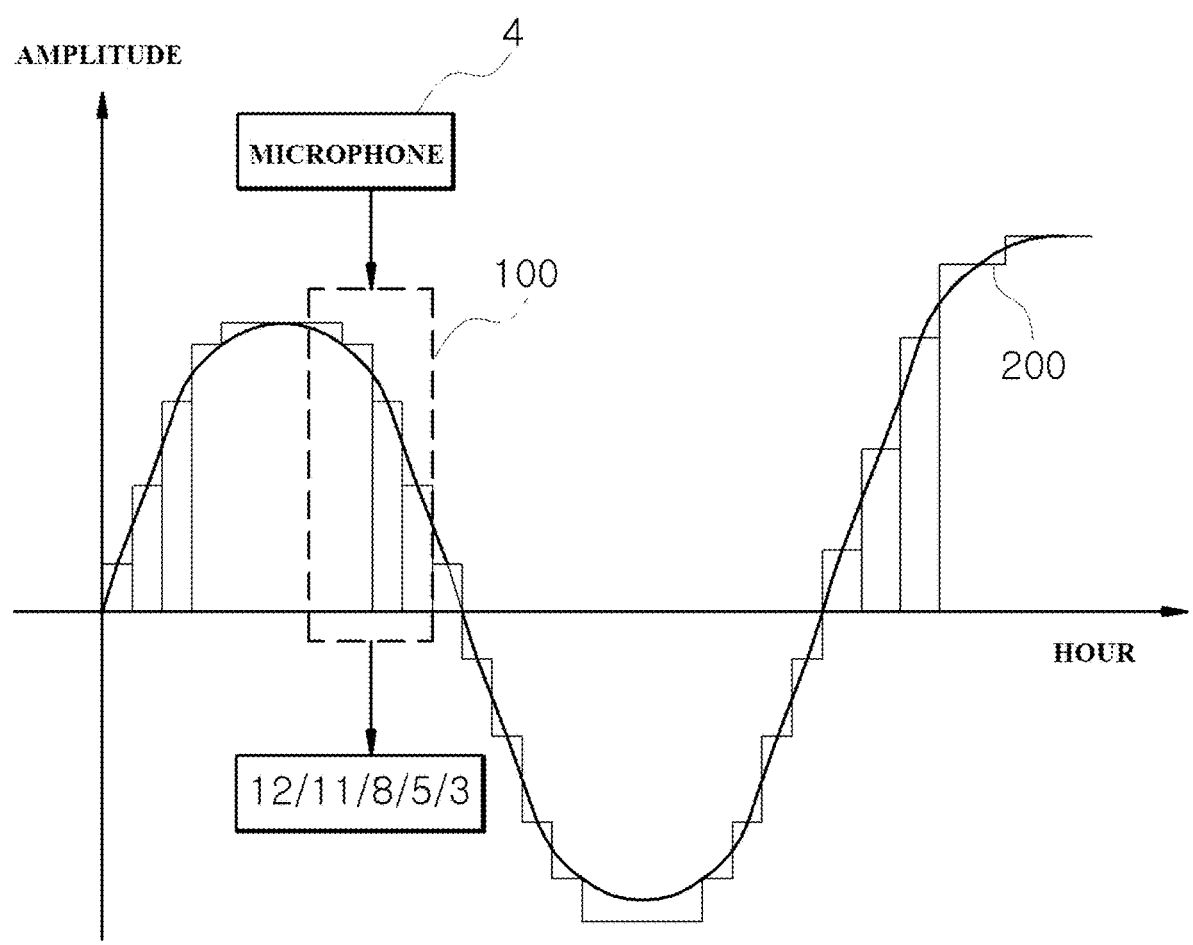
FIG. 3 is a graph illustrating a state in which sound source data are synchronized with each other through the data group reproducing apparatus according to an embodiment of the present invention.

FIG. 1 is a block diagram illustrating a configuration of a data group reproducing apparatus according to an embodiment of the present invention, FIG. 2 is a block diagram illustrating an expanded configuration of a data storage unit included in the data group reproducing apparatus according to an embodiment of the present invention, and FIG. 3 is a graph illustrating a state in which sound source data are synchronized with each other through the data group reproducing apparatus according to an embodiment of the present invention.

Referring to FIGS. 1 to 3, a data group reproducing apparatus 2 according to an embodiment of the present invention is an apparatus, in which some piece of data of sound source data that is already being reproduced through a specific terminal or external speaker is input through a microphone and compared with the entire data of the sound source data, thus to identify a current reproduction point, and synchronize the reproduction point with sound source data being played externally, thereby reproducing the sound source data at the same time. For example, the data group reproducing apparatus 2 according to an embodiment of the present invention refers to a terminal such as a smart phone carried by a user.

In more detail, the data group reproducing apparatus 2 according to an embodiment of the present invention is an apparatus including a synchronization controller 14 configured to compare some piece of data 100 of sound source data input through a microphone 4 with sound source data 200 pre-stored therein, search for reproduction points of the piece of data 100 in the sound source data 200, and synchronize reproduction points with each other, so that specific sound source data are synchronized with each other and reproduced simultaneously in a plurality of user terminals.

That is, the data group reproducing apparatus 2 according to an embodiment of the present invention is an apparatus which receives the sound source data being reproduced through a speaker (not shown) installed in a place such as a square, a cafe, a department store, a concert hall, etc. through the microphone 4, and searches the reproduction points of the sound source data to synchronize with each other. For example, the synchronization controller 14 may be implemented as an application.

In more detail, the synchronization controller 14 includes: a comparison unit 16 configured to compare the some piece of data 100 of the sound source data input through the microphone 4 with sound source data 200 pre-stored therein; a reproduction point determination unit 18 configured to search for a reproduction point of the piece of data 100 in the sound source data 200 pre-stored therein; and a reproduction point synchronization processer 20 configured to control synchronization so as to reproduce the sound source data 200 at the reproduction point determined by the reproduction point determination unit 18.

The reproduction point synchronization processer 20 generates a reproduction control signal for a specific reproduction time and sends it to the reproduction driving unit 8. The reproduction driving unit 8 reproduces the sound source data from a specific point based on the reproduction control signal through a speaker 10 or an earphone 12.

Meanwhile, the data group reproducing apparatus 2 according to an embodiment of the present invention further includes an analog-to-digital converter (ADC) provided at a rear end of the microphone 4 to convert an analog sound source into digital data, and a sound source data storage 6 configured to store the sound source data 200.

In this case, the data group reproducing apparatus 2 may further include a decoding unit 22 configured to, when the sound source data 200 is MP3 data or other data but not PCM data, convert the data into PCM data, and a PCM data storage unit 24 configured to store the decoded PCM data.

For example, referring to FIG. 3, if any one PCM data consists of "4, 6, 10, 11, 12, 11, 8, 5, 3, −4 and . . . ," when assuming that the piece of data 100 input through the microphone 4 is "12, 11, 8, 5, 3," the reproduction point determination unit 18 may determine that the next reproduction point is "−4."

In addition, the data group reproducing apparatus 2 may temporarily convert the sound source data 200 into binary data but not the PCM data. In this case, the data group reproducing apparatus may include a storage unit for storing binary data instead of the PCM data storage unit 24, and the decoding unit 22 includes a decoding process for converting it into binary data.

That is, in summary, the comparison unit 16 provided in the data group reproducing apparatus 2 numerically compares the piece of data 100 with the sound source data 200 to find the current reproduction point.

In addition, preferably, the reproduction point determination unit 18 may determine the reproduction point based on the reproduction duration during which the current reproducing is performed. That is, if the reproduction durations during which reproduction is performed in all sound source data 200 legally distributed are the same as each other, the data may be reproduced at the same point.

For example, when assuming that the reproduction point of any one sound source data is 1 minute, it means that 1 minute has elapsed from the start of reproducing, and when the reproduction driving unit 8 is instructed to reproduce the one-minute reproduction point, the sound source data can be reproduced at the same point.

Accordingly, if any one data group reproducing apparatus 2 reproduces specific sound source data at 1 minute and the other data group reproducing apparatus 2 is also instructed to reproduce the same sound source data at 1 minute, the same sound source data can be reproduced in different data group reproducing apparatuses 2 at the same reproduction point, such that synchronization thereof is achieved in groups.

Meanwhile, the reproduction point determination unit 18 drives a comparison cycle between an output point of the sound source data synchronized through the reproduction point synchronization processer 20 and the reproduction point of the piece of data 100 received through the microphone 4 a number of times, and when the reproduction point is within a preset error range, it is possible to control so that the comparison cycle ends.

That is, the reproduction point determination unit 18 repeats the comparison cycle a plurality of times, such that even a very small error may be reduced. To this end, the sound source data reproduced through the reproduction driving unit 8 is subjected to silence processing until the comparison cycle ends, and the sound source data is actually reproduced after the comparison cycle ends.

The silence processing is executed when only a switch of the speaker 10 is turned off. Since the reproduction driving unit 8 identifies the reproduction point to be reproduced, a size of the error may be determined by comparing the reproduction point with the reproduction point of an external sound source input through the microphone.

In addition, preferably, the sound source data 200 reproducibly distributed through the data group reproducing apparatus 2 includes composite data 60 matched with lighting blinking data 62 including lighting colors and lighting patterns. Accordingly, it is possible to control the lighting so as to blink or turn on at a predetermined reproduction point of the sound source data 200.

The composite data 60 may be generated and distributed by a sound source providing server 30. Further, the lighting blinking data 62 together with the sound source data 200 may be configured and distributed in a packet. In this case, the data may be any one of screen lighting blinking data of the user terminal, or its composite data (data including the sound source data and the screen lighting blinking data matched with the sound source data at a predetermined period).

In addition, the reproduction data includes various data patterns of chords, surround channels, lighting patterns, and lighting colors. The user may select any one data pattern, or the data pattern may be automatically allocated to each user by a subject.

The subject capable of automatically allocating the data pattern for each user may be the user terminal or a remote server.

Figure 4:
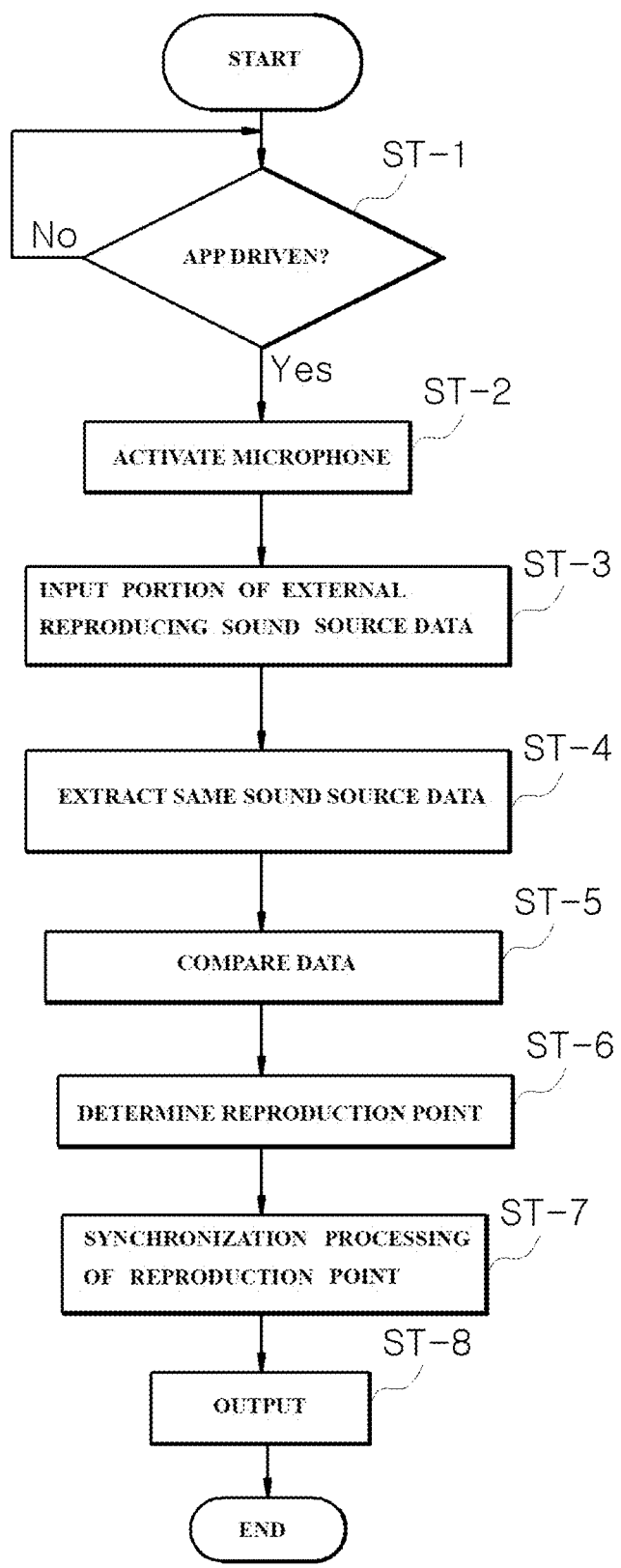
FIG. 4 is a flowchart illustrating a data group reproducing procedure through the data group reproducing apparatus according to an embodiment of the present invention.

FIG. 4 is a flowchart illustrating a data group reproducing procedure through the data group reproducing apparatus according to an embodiment of the present invention.

First, when receiving the piece of data 100 which is a portion of the sound source data input through the microphone provided in the data group reproducing apparatus 2 according to an embodiment of the present invention, the comparison unit compares it with the sound source data 200 pre-stored therein.

In this case, when the sound source data having the piece of data 100 is present in a sound source data storage unit 6 of the data group reproducing apparatus 2, the comparison unit 16 may compare the piece of data 100 with a plurality of sound source data stored in the sound source data storage unit 6 and extract any one sound source data matched with the piece of data 100. Alternatively, the user may designate specific sound source data to extract the sound source data by the comparison unit 16.

If the sound source data 200 matched with the piece of data 100 is not present in the sound source data storage unit 6, the piece of data 100 may be automatically and remotely transmitted to the sound source providing server 30 by the data group reproducing apparatus 2 to request a provision of the sound source data 200.

Next, the reproduction point determination unit 18 searches for a reproduction point of the piece of data 100 in the pre-stored sound source data 200. For example, if the sound source data is PCM data, and any one PCM data consists of "4, 6, 10, 11, 12, 11, 8, 5, 3, −4 and . . . ," when assuming that the piece of data 100 input through the microphone 4 is "12, 11, 8, 5, 3," the reproduction point determination unit 18 may determine that the next reproduction point is "−4."

After the reproduction point is determined, the reproduction point synchronization processer 20 reproduces the sound source data at the reproduction point determined by the reproduction point determination unit 18.

Figure 5:
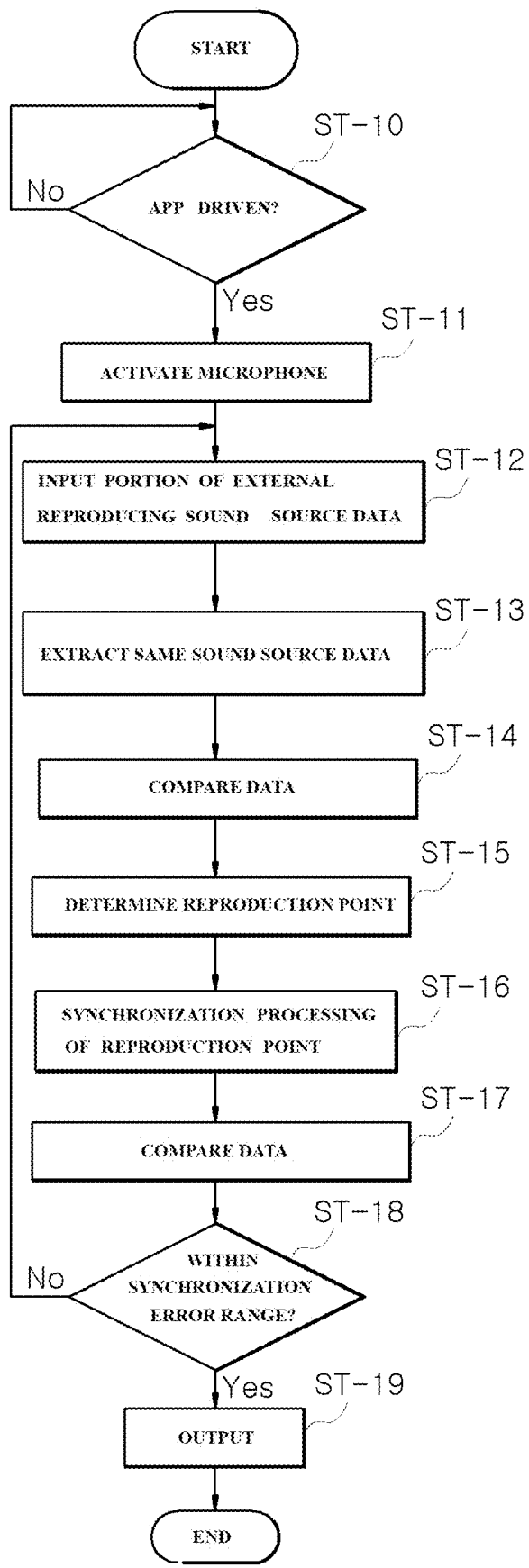
FIG. 5 is a flowchart illustrating a data group reproducing procedure including error correction through the data group reproducing apparatus according to an embodiment of the present invention.

FIG. 5 is a flowchart illustrating a data group reproducing procedure including error correction through the data group reproducing apparatus according to an embodiment of the present invention.

First, continuing from FIG. 4, the reproduction point synchronization processer 20 reproduces the sound source data at a specific point through the reproduction driving unit 8, and then the reproduction point determination unit 18 may again compare the synchronized reproduction point of the sound source data with the reproduction point re-searched through steps a) and b).

Then, the reproduction point determination unit 18 may determine whether the reproduction point is within a preset error range, and if the reproduction point is within the preset error range, the comparison cycle may end.

That is, the reproduction point determination unit 18 repeats the comparison cycle a plurality of times, such that even a very small error may be reduced. To this end, the sound source data reproduced through the reproduction driving unit 8 is subjected to silence processing until the comparison cycle ends, and the sound source data is actually reproduced after the comparison cycle ends.

The silence processing is executed when only a switch of the speaker 10 is turned off. Since the reproduction driving unit 8 identifies the reproduction point to be reproduced, a size of the error may be determined by comparing the reproduction point with the reproduction point of an external sound source input through the microphone.

Figure 6:
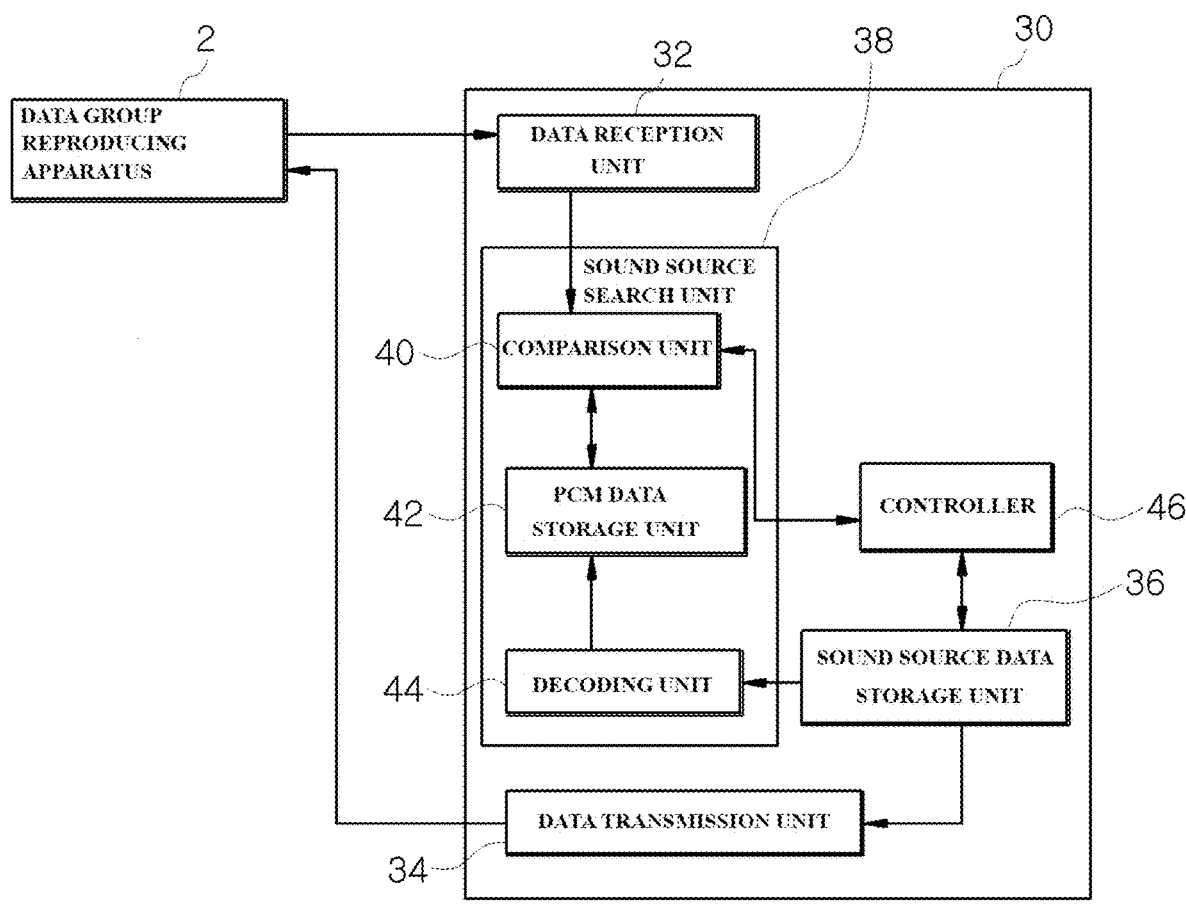
FIG. 6 is a block diagram illustrating a schematic configuration of a system for reproducing data in groups ('data group reproducing system') according to an embodiment of the present invention.

FIG. 6 is a block diagram illustrating a schematic configuration of a data group reproducing system according to an embodiment of the present invention.

Referring to FIG. 6, the data group reproducing system according to an embodiment of the present invention includes a data group reproducing apparatus 2 configured to provide some piece of data 100 of sound source data input through the microphone 4 to the sound source providing server 30 to receive the sound source data 200, compare the piece of data 100 with the sound source data 200, search for the reproduction points of the piece of data 100 in the sound source data 200, and synchronize the reproduction points, so that specific sound source data are synchronized with each other and reproduced simultaneously in a plurality of user terminals; and a sound source providing server 30 configured to receive the piece of data 100 from the data group reproducing apparatus 2, extract the sound source data 200 matched with the piece of data 100, and provide it to the data group reproducing apparatus 2.

In this case, the sound source providing server 30 includes a data reception unit 32 and a data transmission unit 34 which are configured to receive/transmit data from/to a plurality of data group reproducing apparatuses 2, and a sound source data storage unit 36 configured to store a plurality of sound source data 200.

In addition, the sound source providing server 30 includes: a PCM data storage unit 42 configured to convert the sound source data 200 into PCM data to be comparable and store the same therein; a comparison unit 40 configured to numerically compare the piece of data 100 with a plurality of sound source data included in the PCM data storage unit 42 to specify any one sound source data 200 matched with the piece of data 100; and a controller 46 configured to control search and provision of the sound source.

Meanwhile, the sound source providing server 30 included in the data group reproducing system according to an embodiment of the present invention may be a known sound source providing server that searches for specific sound source data using sampling data which is some piece of data of the sound source data.

When the known sound source providing server is equipped in the system, the sound source providing server may not include the decoding unit 44, the PCM data storage unit 42, and the comparison unit 40, unlike the sound source providing server 30 of the present invention.

Figure 7:
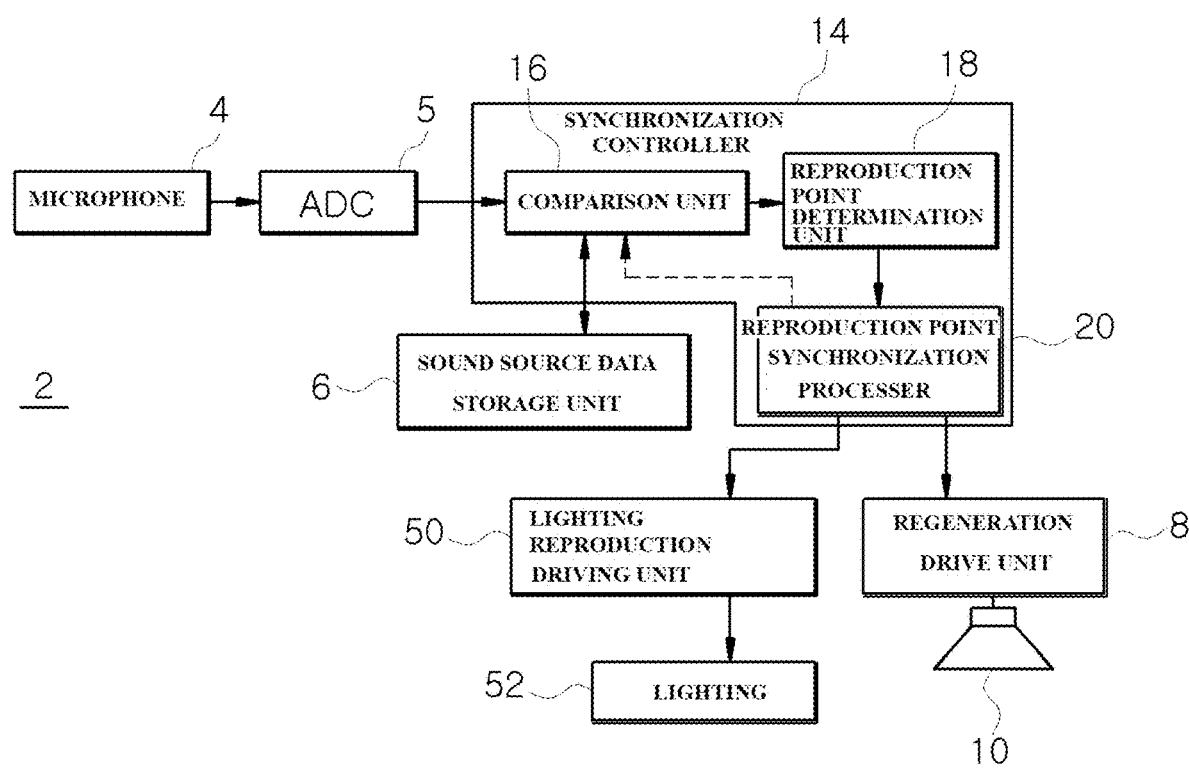
FIG. 7 is a block diagram illustrating a configuration of composite data group reproduction using the data group reproducing apparatus according to an embodiment of the present invention.
Figure 8:
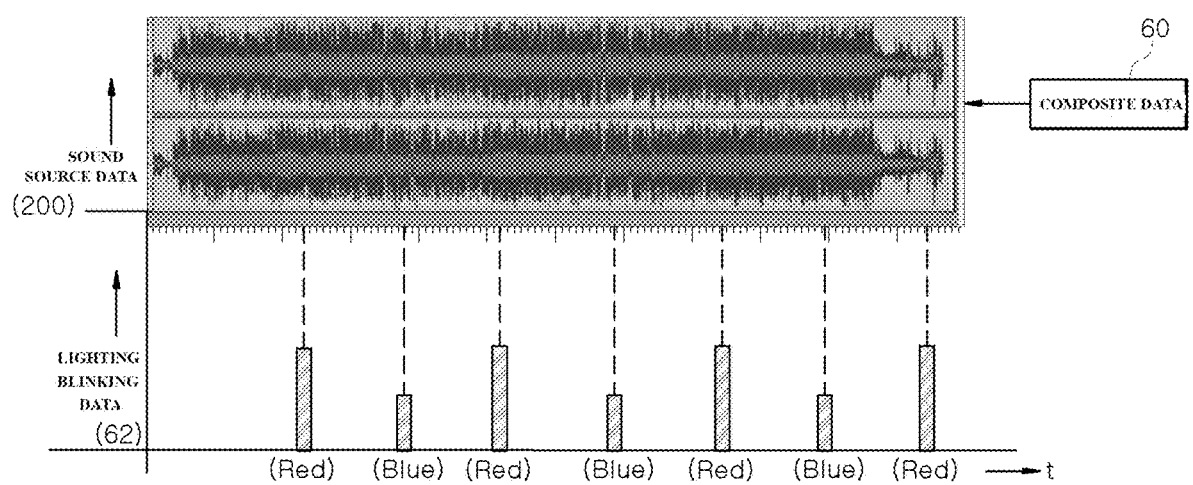
FIG. 8 is a diagram illustrating a configuration of the composite data reproduced through the configuration shown in FIG. 7.

FIG. 7 is a block diagram illustrating a configuration of composite data group reproduction using the data group reproducing apparatus according to an embodiment of the present invention, and FIG. 8 is a diagram illustrating a configuration of the composite data reproduced through the configuration shown in FIG. 7.

Referring to these drawings, the sound source data 200 reproducibly distributed through the data group reproducing apparatus 2 includes the composite data 60 matched with the lighting blinking data 62 including the lighting colors and lighting patterns. Accordingly, it is possible to control the lighting so as to blink or turn on at a predetermined reproduction point of the sound source data 200.

The composite data 60 may be generated and distributed by the sound source providing server 30. Further, the lighting blinking data 62 together with the sound source data 200 may be configured and distributed in a packet. In this case, the data may be any one of screen lighting blinking data of the user terminal, or its composite data (data including the sound source data and the screen lighting blinking data matched with the sound source data at a predetermined period).

In addition, the reproduction data includes various data patterns of chords, surround channels, lighting patterns, and lighting colors. The user may select any one data pattern, or the data pattern may be automatically allocated to each user by a subject.

The subject capable of automatically allocating the data pattern for each user may be the user terminal or a remote server.

Accordingly, the data group reproducing apparatus 2 determines whether the lighting blinking data 62 matched with the sound source data 200 is present. When the lighting blinking data 62 is present, the reproduction point synchronization processor 20 determines whether a preset output point of the lighting blinking data 62 elapses.

Preferably, the lighting blinking data 62 is configured to be matched with the sound source data 200 in advance so as to flash at a predetermined period during reproduction of the sound source data or when the bit is a predetermined intensity or more.

Accordingly, when the output point elapses, the reproduction point synchronization processor 20 controls the lighting reproduction driving unit 50 to turn on or blink the lighting.

Meanwhile, the apparatus, system and method for reproducing data in groups according to the embodiments of the present invention are not limited to above-described embodiments, but may be variously modified without departing from the technical gist of the present invention.

DESCRIPTION OF REFERENCE NUMERALS

2 Data group reproducing apparatus
4 Microphone
5 ADC
6 Sound source data storage unit
8 Regeneration drive unit
14 Synchronization controller
16 Comparison unit
18 Reproduction point determination unit
20 Reproduction point synchronization processor
30 Sound source providing server
100 Piece of data
200 Sound source data

What is claimed is:

1. A system for reproducing data in groups comprising:
a data group reproducing apparatus configured to provide some piece of data of sound source data input through a microphone to a sound source providing server to receive sound source data, compare the piece of data with the sound source data, search for reproduction points of the piece of data in the sound source data, and synchronize the reproduction points, so that specific sound source data are synchronized with each other and reproduced simultaneously in a plurality of user terminals; and
a sound source providing server configured to receive the piece of data from the data group reproducing apparatus, extract the sound source data matched with the piece of data, and provide it to the data group reproducing apparatus,
wherein the data group reproducing apparatus comprises a synchronization controller configured to compare the some piece of data of the sound source data input through the microphone with the sound source data pre-stored therein, search for reproduction points of the piece of data in the sound source data, and synchronize reproduction points with each other, so that specific sound source data are synchronized with each other and reproduced simultaneously in a plurality of user terminals.

2. The system for reproducing data in groups according to claim 1, wherein the synchronization controller comprises:
a comparison unit configured to compare the some piece of data of the sound source data input through the microphone with sound source data pre-stored therein;
a reproduction point determination unit configured to search for a reproduction point of the piece of data in the sound source data pre-stored therein; and
a reproduction point synchronization processor configured to control synchronization so as to reproduce the sound source data at the reproduction point determined by the reproduction point determination unit.

3. The system for reproducing data in groups according to claim 2, wherein the comparison unit numerically compares the piece of data with the sound source data.

4. The system for reproducing data in groups according to claim 2, wherein the reproduction point determination unit drives a comparison cycle between an output point of the sound source data synchronized through the reproduction point synchronization processor and the reproduction point of the piece of data received through the microphone a number of times, and when the reproduction point is within a preset error range, the comparison cycle ends.

5. The system for reproducing data in groups according to claim 1, further comprising an analog-to-digital converter (ADC) provided at a rear end of the microphone to convert an analog sound source into digital data.

6. The system for reproducing data in groups according to claim 1, wherein the data group reproducing apparatus further comprises a sound source data storage configured to store the sound source data.

7. The system for reproducing data in groups according to claim 1, wherein the data group reproducing apparatus comprises:
a decoding unit configured to, when the sound source data is MP3 data, convert the MP3 data into PCM data; and
a PCM data storage unit configured to store the decoded PCM data.

8. The system for reproducing data in groups according to claim 1, wherein the sound source data comprises composite data matched with lighting blinking data including lighting colors and lighting patterns, and controls so that the lighting to blink or turn on at a predetermined reproduction point of the sound source data.

9. A system for reproducing data in groups comprising:

a data group reproducing apparatus configured to provide some piece of data of sound source data input through a microphone to a sound source providing server to receive sound source data, compare the piece of data with the sound source data, search for reproduction points of the piece of data in the sound source data, and synchronize the reproduction points, so that specific sound source data are synchronized with each other and reproduced simultaneously in a plurality of user terminals; and a sound source providing server configured to receive the piece of data from the data group reproducing apparatus, extract the sound source data matched with the piece of data, and provide it to the data group reproducing apparatus, wherein the sound source providing server comprises:

a PCM data storage unit configured to convert the sound source data into PCM data to be comparable and store the same therein; and a comparison unit configured to numerically compare the piece of data with a plurality of sound source data included in the PCM data storage unit to specify any one sound source data matched with the piece of data.

10. A method for reproducing data in groups comprising:

a) comparing piece of data, which is a portion of sound source data input through a microphone, with sound source data pre-stored therein by a comparison unit;

b) if the sound source data matched with the piece of data is not present in a sound source data storage unit, automatically and remotely transmitting the piece of data to a sound source providing server by a data group reproducing apparatus to request a provision of the sound source data;

c) searching for reproduction points of the piece of data in the pre-stored sound source data by a reproduction point determination unit; and d) reproducing specific sound source data at a specific reproduction point searched for by the reproduction point determination unit by a reproduction point synchronization processor.

11. The method for reproducing data in groups according to claim 10, wherein the step a) comprises:

comparing the piece of data with a plurality of sound source data stored in the sound source data storage unit and extract any one sound source data matched with the piece of data by the comparison unit; or extracting the sound source data by a signal of a user who designates the specific sound source data.

12. The method for reproducing data in groups according to claim 10, after the step c), further comprising:

reproducing the sound source data at a specific point through the reproduction driving unit by the reproduction point synchronization processor;

comparing an output point of the synchronized sound source data with the reproduction point re-searched through the steps a) and b) by the reproduction point determination unit;

determining whether the reproduction point is within a preset error range; and if the reproduction point is within the preset error range, ending a comparison cycle.

13. The method for reproducing data in groups according to claim 10, wherein the step c) comprises:

when lighting blinking data matched with the sound source data is present, determining whether an output point of the preset lighting blinking data elapses by the reproduction point synchronization processor; and when the output point elapses, controlling the lighting reproduction driving unit to turn on or blink the lighting by the reproduction point synchronization processor.

* * * * *